W. A. GUNN.
DESK TOP OR LIKE STRUCTURE AND METHOD OF MAKING SAME.
APPLICATION FILED MAY 3, 1920.

1,381,916.                                              Patented June 21, 1921.

Inventor
William A. Gunn
By Frank E. Livrance, Jr.
Attorney

UNITED STATES PATENT OFFICE.

WILLIAM A. GUNN, OF GRAND RAPIDS, MICHIGAN.

DESK-TOP OR LIKE STRUCTURE AND METHOD OF MAKING SAME.

1,381,916. Specification of Letters Patent. Patented June 21, 1921.

Application filed May 3, 1920. Serial No. 378,412.

*To all whom it may concern:*

Be it known that I, WILLIAM A. GUNN, a citizen of the United States of America, residing at Grand Rapids, in the county of Kent and State of Michigan, have invented certain new and useful Improvements in Desk-Tops or like Structures and Methods of Making Same; and I do hereby declare the following to be a full, clear, and exact description of the invention, such as will enable others skilled in the art to which it appertains to make and use the same.

This invention relates to a novel method of making tops for desks or like articles of furniture, and the novel construction produced by such method. Desks in many cases are made with tops covered with linoleum or similar material. Heretofore, it has been common practice to make a desk or like top complete except for the addition of the linoleum or similar material, there being a shallow recess left in the top for the entrance of the linoleum which has to be accurately cut to fit the recess and carefully glued in place. The usual practice is to make a top bed and then secure side and end border members at the sides and ends of the bed, said members extending substantially the thickness of the linoleum to be applied above the bed and thereby make the recess in which the linoleum is placed. There is difficulty in cutting and trimming the large piece of linoleum required to accurately fit the recess and in gluing it properly in place, it having to be stretched at places and pressed together at others, and ironed down to as smooth a surface as possible after it is in place. In addition, any variations in the thickness of the linoleum, or in the depth of the recess, particularly along the side and end border members cause the linoleum to either project above or lie below the upper surfaces of said border members with a resultant roughness in the top where the wood and linoleum meet. It is also necessary to make the border pieces of comparatively wide stock to give the same necessary strength for connection to the bed so as to withstand pressure and force brought against them in the operation of attaching the linoleum. This results in spoiling the effect of the grain of the wood in many cases, particularly that of a quartered oak, on the upper side thereof. The figure or grain will appear on the outer vertical sides of the border pieces but will not show on the upper horizontal sides thereof, and in order to obtain it, it is necessary to glue a veneer strip on the upper side of each border piece, with a resultant adding to the expense of manufacture.

In my invention, the linoleum or like material is glued directly to the top bed, and when the bed is finished to size, the linoleum is cut with the bed to exact size and has smooth edges finished and cut so as to fit snugly the border strips used to complete the top an absolutely closed and water proof joint being made between the border strips and the edges of the linoleum. This allows the use of much narrower border pieces so that the grain of the wood or the figure thereof does not run out and disappear but leaves the desired appearance of the figure of the wood without necessitating any additional veneer strip. In addition, the means used for connecting the side and end border strips permits the adjustment thereof so as to bring the upper surface of the linoleum and the upper sides of the border strips flush at all points, making an absolutely smooth surface where the top changes from the linoleum to the wood border strips. All of these features are inherent in my invention, which may be more fully understood from reference to the accompanying drawing and the following description relating thereto, in which drawing, Figure 1 is a fragmentary perspective view showing one corner of a desk top made in accordance with my invention.

Like reference characters refer to like parts in the different views of the drawing.

Figure 1:
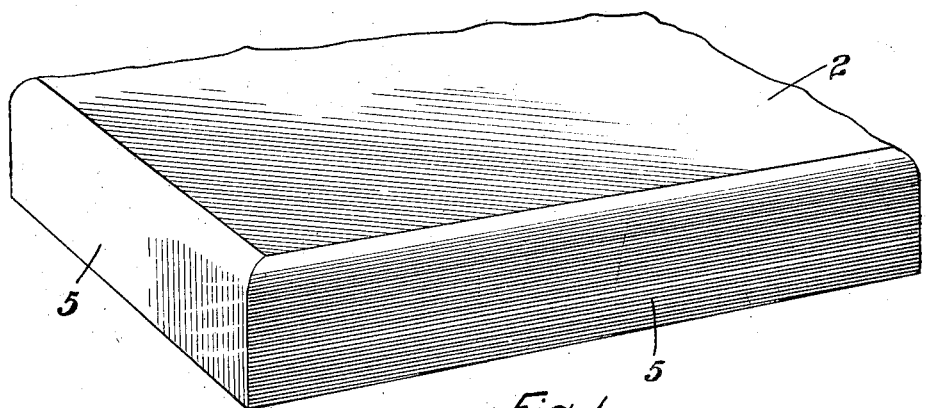
Figure 2:
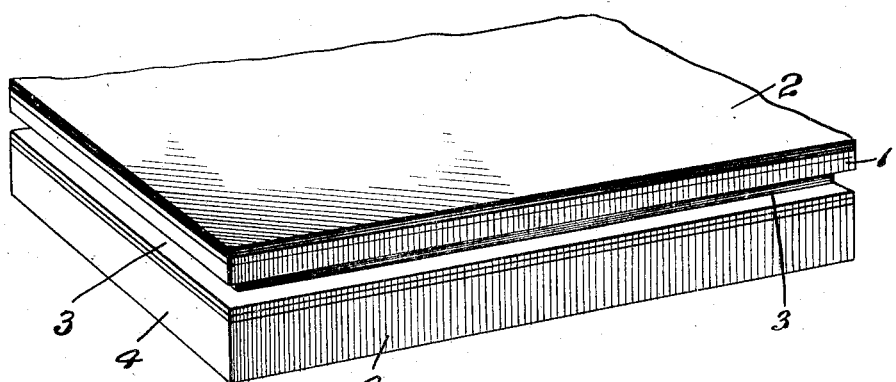
Fig. 2 is a similar view thereof before the border strips are attached.
Figure 3:
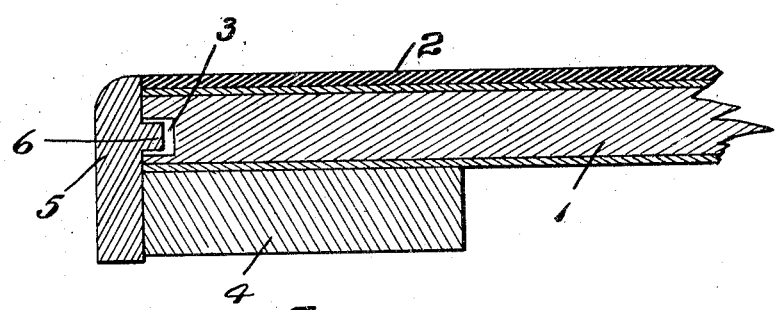
Fig. 3 is a fragmentary section taken vertically through the complete top.

The top bed 1 is of the usual stock including a central core with veneer glued to the upper and lower sides thereof. The linoleum or similar material 2 is glued securely to the upper side of the bed and when the bed is sawed to size, the linoleum is cut to exact size and needs no further operation thereon. A groove 3 is cut in the bed entirely around the same and under frame members 4 are attached in any suitable manner to the under side of the bed at the sides and ends thereof for the purpose of strengthening and reinforcing the bed in the usual manner.

Border strips 5 are glued to the sides and ends of the bed. Each strip has a tongue 6 formed on its inner side in position to enter the groove 3. The groove is larger than the tongue so that the strip may have a limited up or down movement with respect to the bed and permit the positioning of the strips so that at all points in their lengths the same may be brought absolutely flush at their upper edges with the upper surface of the linoleum 2. In the drawing the relative amount of clearance for the tongue with respect to the groove is exaggerated for the purposes of illustration, the clearance needing to be but very slight and the glue completely filling the same when the strip is finally properly positioned, serving to hold the strip in place with its upper edge at all points flush with the adjacent upper surface of the linoleum. The tongue with the glue around it serves to hold the strip against movement and permits the ready raising or lowering of the strip at different points in its length so that it will lie flush with the linoleum, and also makes a better and firmer connection between the bed and said strips.

With this method of making desk tops, the border strips need to be of but little thickness and when rounded at their upper outer corners, the grain of the wood is not appreciably changed. An absolutely level top is made and the old hard method of attaching the linoleum cover is done away with. Practically no line of demarcation can be seen between the linoleum and the strips other than the difference in coloring; and no roughness nor unevenness is present at the juncture of the linoleum and border strips. The joint is water proof, there being no openings or cracks between the border strips and the edges of the linoleum permitting the entrance of water or the like, nor any possibility of such openings or cracks later developing. While I have described the structure and method as applicable to the making of desk tops, it is evident that the same method and construction may be followed in making tops for other articles of furniture, such as tables or the like, and that the invention is not limited to use with linoleum, as leather or any other similar material which may be used can be applied in exactly the same way. The invention is defined in the appended claims and I consider myself entitled to all variations thereof which may be made from the specific disclosure made which come within the scope thereof.

I claim:

1. The method of making tops for desks or like furniture which consists in gluing a cover of flexible material to the upper side of the bed for the top, then cutting the bed and attached cover to size, and then gluing relatively narrow border strips to the sides and ends of the bed and the side and end edges of the cover and in conforming the strips to locate the upper edges thereof flush with the adjacent upper surface of the cover.

2. The method of making tops for desks or like furniture which consists in gluing a cover of flexible material to the upper side of the bed for the top, cutting a groove in each end and side edge of the bed, cutting the bed and attached cover to size and then gluing relatively narrow border strips to the sides and ends of the bed, each of said border strips having a tongue to enter the adjacent groove in its respective end or side of the top and of less thickness than the width of the groove and in conforming the strips to place the upper edges thereof in the same plane with the upper side of the cover.

In testimony whereof I affix my signature.

WILLIAM A GUNN.